United States Patent [19]

Olson

[11] Patent Number: 5,860,015

[45] Date of Patent: Jan. 12, 1999

[54] DETACHABLE PALM REST WITH BACKUP BATTERY

[75] Inventor: Anthony Olson, Dakota Dunes, S. Dak.

[73] Assignee: Gateway 2000, Inc., North Sioux City, S. Dak.

[21] Appl. No.: 572,313

[22] Filed: Dec. 14, 1995

[51] Int. Cl.$^6$ ............................................. G06F 1/26
[52] U.S. Cl. ................. 395/750.01; 395/750.02; 395/750.03; 395/750.05; 395/750.06; 395/750.08
[58] Field of Search .................. 395/750, 750.01, 395/750.02, 750.03, 750.05, 750.06, 750.08

[56] References Cited

U.S. PATENT DOCUMENTS

| | | | |
|---|---|---|---|
| 5,107,401 | 4/1992 | Youn | 361/393 |
| 5,163,153 | 11/1992 | Cole et al. | 395/750 |
| 5,241,680 | 8/1993 | Cole et al. | 395/750 |
| 5,293,300 | 3/1994 | Leung | 361/683 |
| 5,323,291 | 6/1994 | Boyle et al. | 361/683 |
| 5,333,116 | 7/1994 | Hawkins et al. | 364/708.1 |
| 5,410,141 | 4/1995 | Koenck et al. | 235/472 |
| 5,475,626 | 12/1995 | Viletto | 364/708.1 |
| 5,485,073 | 1/1996 | Kasashima et al. | 320/15 |
| 5,487,181 | 1/1996 | Dailey et al. | 455/89 |
| 5,514,946 | 5/1996 | Lia et al. | 320/31 |
| 5,517,434 | 5/1996 | Hanson et al. | 364/708.1 |
| 5,532,524 | 7/1996 | Townsley | 307/64 |
| 5,539,876 | 7/1996 | Saito et al. | 395/182.12 |
| 5,553,294 | 9/1996 | Nanno et al. | 395/750 |
| 5,563,493 | 10/1996 | Matsuda et al. | 320/6 |
| 5,566,340 | 10/1996 | Stewart et al. | 395/750 |
| 5,592,362 | 1/1997 | Ohgami et al. | 361/686 |
| 5,596,482 | 1/1997 | Horikoshi | 361/683 |
| 5,604,050 | 2/1997 | Brunette et al. | 429/97 |
| 5,621,299 | 4/1997 | Krall | 320/5 |
| 5,641,588 | 6/1997 | Sieminski et al. | 429/98 |
| 5,668,570 | 9/1997 | Ditzik | 345/173 |
| 5,721,933 | 2/1998 | Walsh et al. | 395/750 |

*Primary Examiner*—Meng-Al T. An
*Assistant Examiner*—Valerie Darbe
*Attorney, Agent, or Firm*—Schwegman, Lundberg, Woessner & Kluth, P.A.

[57] ABSTRACT

A computer system combines a portable computer and a detachable palm rest containing a backup battery. When the palm rest is attached to the portable computer, power control circuitry within the computer provides automatic switching between the primary battery in the computer and the backup battery in the palm rest when the active battery becomes low. The power control circuitry also recharges the standby battery whenever the computer is plugged into external power. Power monitoring circuity displays the status of the standby battery on an indicator built into the palm rest.

15 Claims, 4 Drawing Sheets

DETACHABLE PALM REST WITH BACKUP BATTERY

FIELD OF THE INVENTION

The present invention is in the field of portable computers and in particular to attaching a backup battery to a portable computer.

BACKGROUND OF THE INVENTION

Designers and manufacturers of small portable computers ("lap-tops") are confronted with two major problems: the relatively short amount of time a lap-top can operate without external power, and size limitations that require trade-offs among typing efficiency, user comfort and portability.

Previous attempts at solving these problems include the provision of power packs containing the primary battery for the computer and most have some mechanism to swap a low battery for a charged one. However, despite new technology increasing the life of lap-top batteries, a single battery still only provides between one and five hours of power. To overcome the inconvenience of short battery life, several manufacturers have built lap-tops with capacity for two batteries within the case. The weakness of this approach is that it requires the user to forego a peripheral such as a floppy disk drive when using the secondary battery because the small size of the standard laptop case leaves little if any room for anything other than electronic devices and the primary battery.

The size of the lap-top case is also a limiting factor in incorporating a palm rest in front of the keyboard on which users ray rest their palms and wrists while typing. The smaller lap-top cases have very little surface area remaining after the keyboard has been installed Therefore in order to provide a palm rest, the manufacturer must choose between using a larger case or reducing the size of the keyboard. Using a larger case increases the weight of the lap-top and makes it more difficult to fit in a brief case. It may also add to the minimum operating weight. Reducing the size of the keyboard avoids these problems but introduces its own drawbacks. Whether the manufacturer combines several key functions into one key, eliminates certain keys and/or makes the keys themselves smaller, the user's typing becomes more error-prone. While palm rests make typing more comfortable and therefore more efficient, any benefit gained by having a palm rest on the lap-top is offset by the increase in key stroke errors. Despite their disadvantages, palm rests on lap-tops remain a desirable feature because they may help prevent discomfort and potential long term injury to the user.

SUMMARY OF THE INVENTION

A portable computer ("lap-top") contains a primary battery, a palm rest containing a backup battery, an arrangement for attaching the palm rest to the lap-top, and the necessary electrical connections to enable the backup battery in the palm rest to power the lap-top. The present invention provides the ability to extend the amount of time the lap-top can operate without external power and at the same time, provides a palm rest attachable to a small size lap-top case without incurring inefficiencies associated with a smaller keyboard The design of the palm rest is such that it is easily attached or detached at the user's option. When attached, it becomes an integral and continuous part of the lap-top and provides a second battery, thereby increasing both the comfort and usability of the lap-top. When the palm rest is detached, the lap-top becomes more easily transported due to its smaller size while maintaining the ability to operate without external power by using the primary battery as its power source.

Furthermore, the present invention adapts standard computer power controller functions to take advantage of having two batteries. The power controller comprises power distribution circuitry, and standard battery monitoring and charging circuitry in the lap-top that detect when a battery is present in the attached palm rest. In one embodiment, the battery monitoring circuit then monitors the discharge state of the battery powering the laptop and switches to the other battery when the discharge state reaches a pre-defined level. This operation is automatic and transparent to the user. In a further embodiment, the power controller distributes power from both batteries, to minimize the peak current flow from any one battery. In yet a further embodiment, the primary battery is charged whenever the palm rest battery is available for supplying power. This provides the benefit of optimizing the ability to power the lap-top when the palm rest is detached for increased portability. In a further embodiment, when the lap-top is plugged into external power and the palm rest battery is present, the charging circuit determines which battery is currently inactive and recharges that battery if necessary, giving the primary battery priority. When the lap-top is plugged into external power and the palm rest battery is not present, the charging circuit reverts to its industry standard operation and recharges the active battery if necessary. In either case, the user is ensured of having a charged battery available to power the lap-top.

One embodiment of the computer system is a palm top housing molded to conform to industry accepted ergonomic standards, having an opening sized to hold a standard lap-top battery. The palm rest battery is a backup to the primary battery in the lap-top itself Positive and negative contacts are provided in the housing to couple to the positive and negative terminals of the backup battery. These contacts extend through the housing so that they will connect with corresponding contacts coupled to the power controller in the lap-top itself Once coupled together, these contacts provide a complete electrical circuit between the lap-top power controller and the backup battery: A latching mechanism coupled to the housing attaches the palm rest to the portable computer in front of the computer at the natural resting location of the user's palms while typing, thereby providing a comfortable and supportive base for the user's hands.

In a further embodiment the latching mechanism, comprising two latch hooks, fits into slots located on the lap-top and automatically locks into those slots when the palm rest is attached onto the computer. The palm rest is detached from the lap-top when the user presses a quick release button(s) that disengages the hooks from the slots.

A protruding structure on the palm rest housing is formed during the molding process. This protruding structure is formed to fit tightly into a cutout molded into the computer case. The electrical contacts coupled to the backup battery are then positioned on this protruding structure. These electrical contacts mate to corresponding electrical contacts positioned within the cutout which are coupled to the power controller of the lap-top. This tight interlocking arrangement provides a firm electrical connection between the two sets of electrical contacts and ensures a steady flow of power from the backup battery to the computer.

Furthermore, a door sized to fit over the cutout in the computer case is attached to the case in a fashion that permits it to slide into a recess in the case when open so it does not interfere with the tight fit between the lap-top and the palm rest.

As described above, this invention provides the lap-top user with many advantages over previous solutions. The palm rest provides more comfort, greater typing efficiency, and a longer operating time without external power.

DESCRIPTION OF THE PREFERRED EMBODIMENT

In the following detailed description of the preferred embodiment reference is made to the accompanying drawings which form a part hereof and in which is shown by way of illustration specific preferred embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Numbering in the Figures is usually done with the hundreds digits corresponding to the figure number, with the exception that the same components may appear in multiple figures. Signals and connections may be referred to by the same number or label, and the actual meaning should be clear from the context of use.

Figure 1:
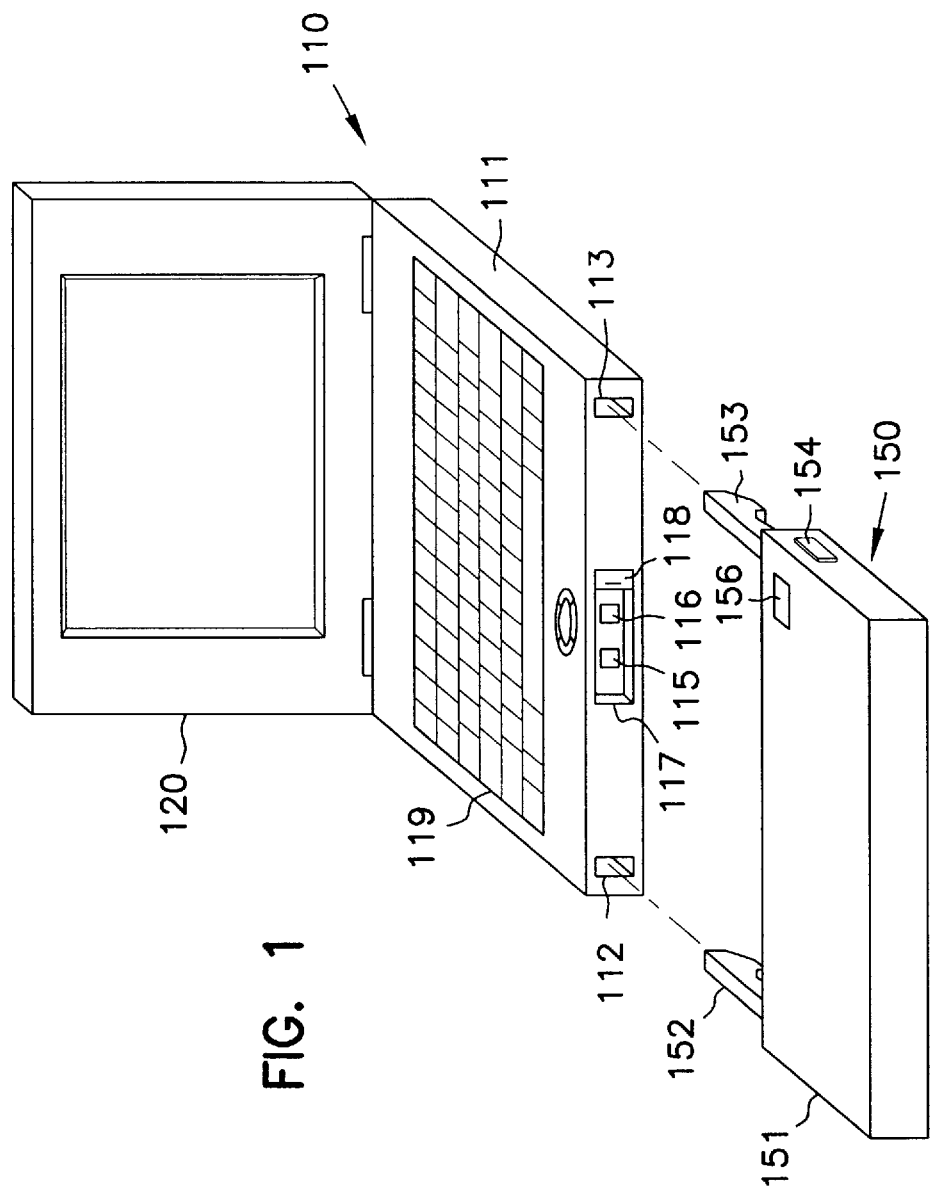
FIG. 1 is a perspective view of the present invention illustrating a palm rest detached from a portable computer.

FIG. 1 shows a front perspective of a portable computer 110 generally small enough to carry in a briefcase, such as a Gateway 2000 Colorbook™[2], and a detachable palm rest 150 that locks into position in front of the computer 110 at the natural resting location of the user's palms while typing.

Figure 3:
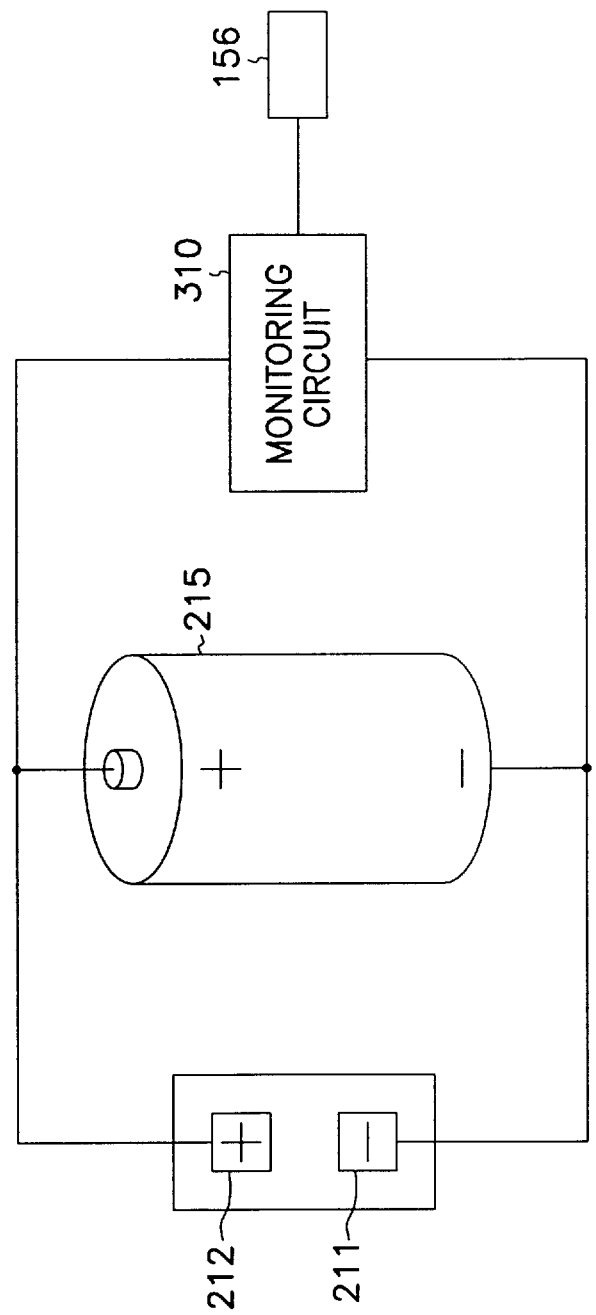
FIG. 3 is a block circuit diagram of the electrical connections between the components of the palm rest of FIG. 1.
Figure 4:
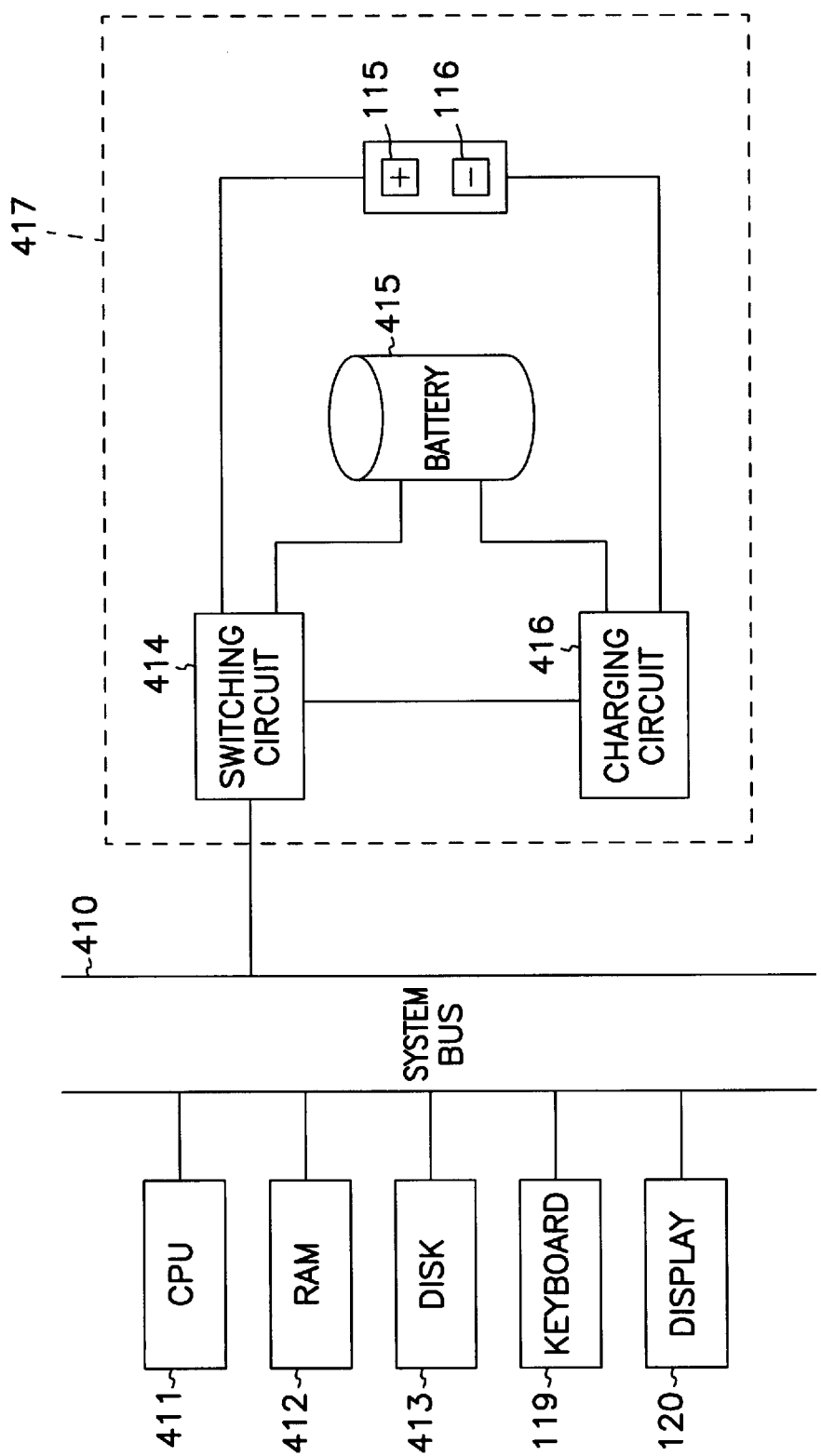
FIG. 4, is a block diagram of the connections between the components of the computer of FIG. 1.

The computer 110 comprises a computer case 111, a keyboard 119 and a display unit 120. Latch slots 112 and 113, and a cutout 117 are formed through injection molding on the edge of the case 111 in front of the keyboard 119 where the palm rest 150 attaches. Electrical contacts 115 and 116 are coupled to the lap-top's power controller as explained below, and are positioned within the cutout 117. A door 118 slides over the cutout 117 to protect the electrical contacts 115 and 116 when the palm rest 150 is detached, door 118 retracts into the case 111 when not in use. An alternate embodiment of the invention places one or both electrical contacts 115 and 116 flush in the case 111, and eliminates the cutout 117 and the door 118. The electrical contacts 115 and 116 are be disposed anywhere on the edge of the computer case 111 so long as they mate with corresponding electrical contacts disposed on the palm rest 150 which are described below. Further embodiments comprise a single electrical contact, or more than two contacts for additional signal connections, such as an additional ground, depending on the arrangement and location of the electrical circuitry of the computer 110 and the palm rest 150 as shown in FIGS. 3 and 4.

Palm rest 150 comprises a palm rest housing 151 having latch hooks 152 and 153 formed to fit and automatically lock into the latch slots 112 and 113 on the computer case 111. The latch hooks 151 and 152 are disengaged by two quick release buttons 154 and 155 (shown in FIG. 2.), one release button is positioned on each side of the housing 151, and operate as a fulcrum to lift the latches against a spring located within housing 151 which biases the latches in place. A battery status indicator 156 is bonded into the housing 151.

Other mechanisms for attaching and detaching the palm rest 150 and the lap-top 110, and alternate locations for those mechanisms, will be apparent to those skilled in the art, as will the use of alternate materials and manufacturing methods for making the computer case 111 and the palm rest housing 151. In a further embodiment, latches 152 and 153 are hinged to fold toward each other, thereby reducing the space required to store the palm rest.

Figure 2:
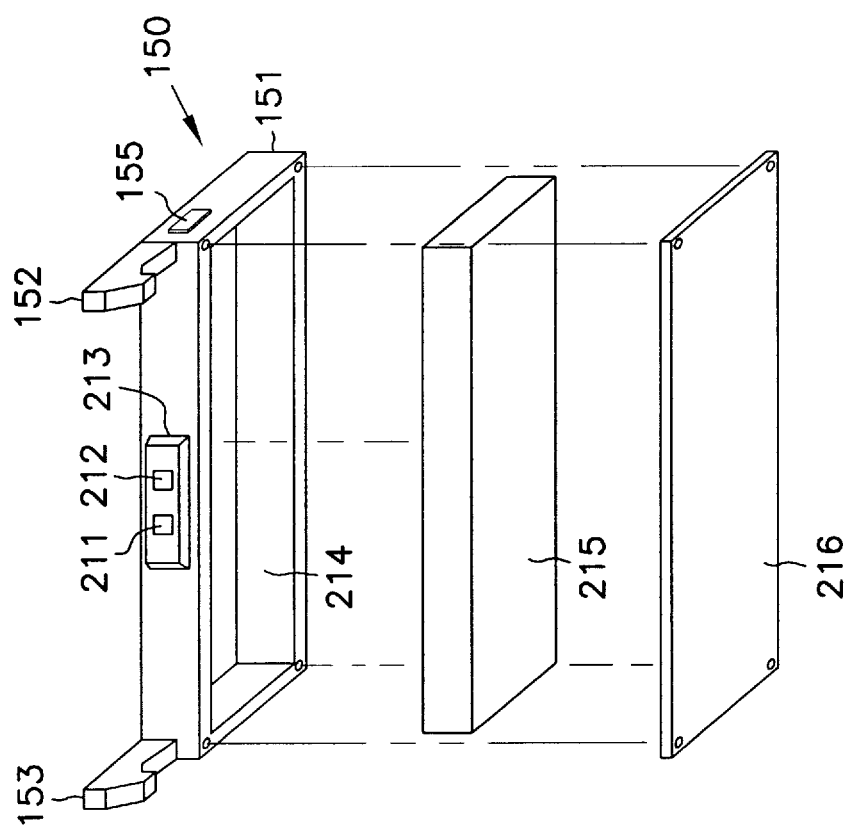
FIG. 2 is an exploded perspective view of the bottom of the palm rest of FIG. 1, illustrating the insertion of a battery into an opening in the bottom of the palm rest.

FIG. 2 shows a perspective view of the back and bottom of palm rest housing 151. During the manufacturing process, a protruding structure 213 is molded on the back of the housing 151 to fit into cutout 117. Electrical contacts 211 and 212 are positioned on the protruding structure 213 so that they mate with electrical contacts 115 and 116 in cutout 117 on the computer case 111 to form a firm electrical connection. In one embodiment, the contacts are spring biased such that the springs compress when the palm rest is attached to the lap-top, providing better electrical contact. The molding process also creates an opening 214 in the housing 151 sized and shaped to hold a standard lap-top battery 215 such as a nickel-metal hydride rechargeable battery model number 10HR4/SAU-KSO-2 (Sanyo Electric Co., Ltd.). A removable cover 216 fastens to the housing 151 to secure the battery 215 and seal the opening 214. In an alternate embodiment, the battery 215 and the housing 151 are molded as a single unit and the palm rest 150 itself becomes a replaceable component. The palm reset 150 in one embodiment is then covered in a suitable well padded fabric to enhance comfort for the user, leaving open the side of the palm rest which connects to the lap-top computer 110.

In a further embodiment, electrical contacts 211 and 212 are provided integral to or along the outside edges of latch hooks 152 and/or 153. Mating electrical contacts 115 and 116 are then disposed within slots 112 and 113 to correspondingly couple to the palm rest contacts 211 and 212.

FIG. 3 is a block diagram of the circuitry of palm top 150. Electrical contacts 211 and 212 are coupled to the positive and negative terminals of a battery 215. A standard power monitoring circuit 310 is coupled to the battery 215 and to a standard battery status indicator 156. The power monitoring circuit 310 constantly checks the power level of the battery 215 and relays the power status to the status indicator 156. In an alternate embodiment, the power monitoring circuit 310 and status indicator 156 are located in computer case 111 and coupled to electrical contacts 115 and 116. Suitable power monitoring circuitry and status indicators are in common use today for laptop computers. A connector and appropriate circuitry (not shown) is also provided for independently coupling the backup battery to AC power and charging it separately from the computer 110.

FIG. 4 is a block diagram of the electrical circuitry of portable computer 110 showing industry standard connections between standard components of a personal computer, whether an Apple or an IBM-compatible machine, or some variant thereof comprising a system address/data and power bus 410, for distributing power and communicatively linking a central processing unit 411, a random access memory 412, a hard disk data storage device 413, a keyboard 119, and a display unit 120. A power controller 417 is also provided to select between batteries for use and for recharging. The power controller 417 is configured to receive external power via a standard jack coupled to an AC power adapter which is not shown. Power monitoring circuit 310 and status indicator 156 form a part of the power controller 417 in one embodiment.

The power controller 417 comprises a standard power switching circuit 414 coupled to the system bus 410, to a primary battery 415 and to electrical contacts 115 and 116. The power switching circuit 414 detects and becomes active when a palm rest 150 containing a battery 215 is attached to the computer 110. The power switching circuit 414 also monitors the discharge state of the primary battery, and receives information about the discharge state of the palm rest battery from monitoring circuit 310. It switches distribution of power to the non-active battery when the active battery reaches a pre-defined discharge level. The power controller 417 further comprises a standard battery charging circuit 416 coupled to the primary battery 415, to the electrical contacts 115 and 116, and to the power switching circuit 414. The battery charging circuit 416 is activated when the computer 110 is connected to an external power source and recharges the non-active battery when both the primary battery 415 and battery 215 are present. When only the primary battery 415 is present, the battery charging circuit reverts to its standard function and recharges the primary battery 415. In one embodiment, the power controller distributes power from both batteries, to utilize the peak current flow from any one battery. In yet a further embodiment, the primary battery becomes non-active whenever the palm rest battery is available for supplying power. If external power is available, the primary battery receives priority for recharging. This provides the benefit of optimizing the ability to power the lap-top when the palm rest is detached for increased portability.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising:
  a portable computer having a primary battery disposed within the computer for providing power for the computer;
  a palm rest having a backup battery housed entirely within the palm rest;
  a latching arrangement for attaching the palm rest to the portable computer; and
  mating electrical connections disposed on the palm rest and portable computer for powering the portable computer from the backup battery,
  wherein the computer selectively switches between the primary battery and the backup battery when the battery providing power to the computer reaches a pre-defined discharge state.

2. The computer system of claim 1 and further comprising:
  a power distribution bus for distributing power to the computer system; and
  a power controller coupled to the power distribution bus, the primary battery, and the electrical connections on the portable computer for selectively switching between the primary battery and the backup battery.

3. The computer system of claim 2 wherein the power controller also controls recharging of the batteries.

4. The computer system of claim 3 wherein the power controller gives priority to charging the primary battery when external power is supplied to the computer system.

5. The computer system of claim 2 wherein the power controller switches to the backup battery when the palm rest is coupled to the portable computer provided the backup battery has sufficient charge.

6. A palm rest for a portable computer comprising:
  a battery for providing backup power to the portable computer wherein the computer selectively switches between a primary battery disposed within the portable computer and the backup battery when the battery providing power to the computer reaches a predefined discharge state;
  a housing having an opening therein formed to fit the backup battery;
  at least two electrical contacts coupled to the positive and negative terminals of the backup battery and extending through the housing to couple with corresponding electrical contacts on the portable computer for completing a circuit between the battery and the portable computer; and
  a latching mechanism externally coupled to the housing for attaching the palm rest to the portable computer at the natural resting location of the user's palms while typing.

7. The palm rest of claim 6, and further comprising:
  a battery monitoring circuit coupled to the backup battery for monitoring the power level of the backup battery; and
  an indicator externally mounted on the housing and coupled to the battery monitoring circuit for displaying the status of the backup battery.

8. The palm rest of claim 7, wherein:
  the latching mechanism comprises:
    at least two latch hooks formed to fit into slots on the portable computer for automatically locking the palm rest in place; and
    at least one quick release button for disengaging the latch hooks from the slots.

9. The palm rest of claim 7, and further comprising:
  a protruding structure formed in the housing to fit into a cutout on the portable computer wherein:
    at least one electrical contact is positioned on the protruding structure to couple with at least one electrical contact positioned within the cutout.

10. The palm rest of claim 7, and further comprising:
  a cover formed to fit over the opening and attached to the housing for securing and protecting the backup battery.

11. The palm rest of claim 7, wherein:
  the backup battery is permanently sealed into the opening in the housing.

12. A portable computer having a primary battery disposed therein for providing power for the computer and having a case for coupling to a palm rest having a backup battery housed entirely within the palm rest, the computer comprising:
  a system address/data and power bus;
  a central processing unit coupled to the system bus;
  random access memory coupled to the system bus;
  hard disk data storage coupled to the system bus;
  a display unit coupled to the system bus;

a keyboard coupled to the system bus;

a primary battery coupled to the system bus;

at least two electrical contacts in the computer case in front of the keyboard and formed to couple with corresponding electrical contacts located on the palm rest for completing a circuit between the portable computer and the backup battery;

a power controller coupled to the system bus, the primary battery, and the electrical contacts for automatically switching between the primary battery and the backup battery when the battery providing power to the computer reaches a pre-defined discharge state, and for recharging the batteries; and a latch receptacle coupled to the computer case and formed to accept a latching mechanism coupled to the palm rest.

13. The portable computer of claim 12, wherein:

the power controller comprises:

a switching circuit coupled to the system bus, the primary battery, and the electrical contacts for automatically switching between the primary battery and the backup battery when the backup battery is present and the battery providing power to the portable computer reaches the pre-defined discharge state; and a charging circuit coupled to the primary battery, the electrical contacts, and the switching circuit for charging the battery that is not providing power to the computer when the backup battery is present and the portable computer is connected to an external power source.

14. The portable computer of claim 12, wherein:

the latch receptacle comprises at least two slots formed in the computer case to fit the latching mechanism of the palm rest.

15. The portable computer of claim 12, further comprising:

a cutout formed in the computer case in front of the keyboard to fit a protruding structure formed in the palm rest wherein:

the electrical contacts are positioned in the cutout; and a door formed to cover the cutout and to recess into the computer case upon opening for protecting the electrical contacts when the palm rest is detached.

* * * * *

UNITED STATES PATENT AND TRADEMARK OFFICE
Certificate

Patent No. 5,860,015            Patented: January 12, 1999

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Anthony Olson, Dakota Dunes, SD; and Larry Nickum, Sioux City, IA.

Signed and Sealed this Ninth Day of November, 1999.

AYAZ R. SHEIKH, *SPE*
Art Unit 2781